(12) United States Patent
Muramatsu et al.

(10) Patent No.: US 7,766,239 B2
(45) Date of Patent: Aug. 3, 2010

(54) CODE STRUCTURE AND CODE READING TERMINAL

(75) Inventors: Takeharu Muramatsu, Chiba (JP); Hirokazu Ishikawa, Hiroshima (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 523 days.

(21) Appl. No.: 10/618,762

(22) Filed: Jul. 15, 2003

(65) Prior Publication Data

US 2004/0014490 A1 Jan. 22, 2004

(30) Foreign Application Priority Data

Jul. 16, 2002 (JP) ............... 2002-206736

(51) Int. Cl.
*G06K 7/10* (2006.01)

(52) U.S. Cl. ............... 235/462.01; 235/462.45

(58) Field of Classification Search ........... 235/462.01, 235/375, 462.1, 462.24, 462.25, 462.45, 235/472, 462.09, 462.15, 472.01

See application file for complete search history.

(56) References Cited

U.S. PATENT DOCUMENTS

| 4,437,378 | A | | 3/1984 | Ishida et al. |
| 4,974,096 | A | * | 11/1990 | Wash .................... 358/302 |
| 5,406,024 | A | | 4/1995 | Shioda |
| 5,457,309 | A | * | 10/1995 | Pelton ................... 235/462.28 |
| 5,659,167 | A | * | 8/1997 | Wang et al. ........... 235/472.01 |
| 5,953,290 | A | * | 9/1999 | Fukuda et al. ......... 434/307 A |
| 6,123,261 | A | * | 9/2000 | Roustaei ............... 235/462.01 |
| 6,267,296 | B1 | | 7/2001 | Ooshima et al. |
| 6,269,446 | B1 | | 7/2001 | Schumacher et al. |
| 2001/0034222 | A1 | * | 10/2001 | Roustaei et al. ............. 455/403 |
| 2002/0003886 | A1 | | 1/2002 | Hillegass et al. |
| 2002/0030104 | A1 | | 3/2002 | Matsui et al. |
| 2003/0017848 | A1 | * | 1/2003 | Engstrom et al. ........... 455/558 |
| 2003/0089764 | A1 | * | 5/2003 | Meadow et al. ............. 235/375 |
| 2004/0053650 | A1 | * | 3/2004 | Roper .................... 455/575.8 |
| 2005/0005760 | A1 | * | 1/2005 | Hull et al. ..................... 84/645 |

FOREIGN PATENT DOCUMENTS

| DE | 41 07 020 A1 | | 9/1992 |
| EP | 0 795 863 A2 | | 9/1997 |
| EP | 0 984 385 A2 | | 3/2000 |
| JP | 2002-092543 | | 3/2002 |
| JP | 2002-125008 | | 4/2002 |
| JP | 2002-125008 A | | 4/2002 |
| JP | 2004206447 | * | 7/2004 |
| KR | 10-1997-0066847 | | 10/1997 |
| KR | 2001-0048327 A | | 6/2001 |
| WO | WO-02/41101 A2 | | 5/2002 |

* cited by examiner * cited by examiner

*Primary Examiner*—Daniel St.Cyr
(74) *Attorney, Agent, or Firm*—Birch, Stewart, Kolasch & Birch, LLP

(57) ABSTRACT

A code-reading apparatus determines the type of data in recorded code data and carries out appropriate processes depending on the determined type of data. The code-reading apparatus comprises an imaging unit 7 for photographing encoded data. The encoded data comprises a header portion and a body portion, the body portion including encoded ring tone data, the header portion including a data identifier D indicating the type of data in the body portion. The apparatus further comprises a data identifier unit 19*a* for identifying the type of the encoded data photographed by the imaging unit 7 based on the data identifier D, and control units 13 and 19 for reading the encoded data depending on the identified data type and for reproducing the ring tone data that has been read.

15 Claims, 6 Drawing Sheets

D = DATA IDENTIFIER (ex: 0 x 00, 0 x FF)
M = MAKER IDENTIFYING CODE
F = FORMAT NUMBER
C1 = ENCRYPTION IDENTIFIER
C2 = ENCRYPTION VERSION
S = LENGTH OF TITLE (N)
T = TITLE INFORMATION

CODE STRUCTURE AND CODE READING TERMINAL

BACKGROUND OF THE INVENTION

1. Field of the Invention

The present invention relates to a code structure and code reading terminal.

2. Background Art

Many cellular phones are equipped with a function to allow the user to choose and register a desired ring tone such as a melody. In order to register a ring tone, the user can manually carry out certain key operations on their cell phone. Alternatively, if the phone is capable of accessing the Internet, the user can access a certain service site from which ring tone data can be downloaded.

JP Patent Publication (Kokai) No. 2002-125008 A discloses a method of registering ring tone data by rendering cellular phone ring tone data into a two-dimensional code that is then printed and read by a camera.

Sometimes data other than ring tone data is required to be recorded in the two-dimensional code. In such a case, it is necessary to appropriately separate the ring tone data from other data in the recorded data. For example, if a different kind of data, such as text data, is encoded in the two-dimensional code together with the ring tone data for cellular phone, a reader might mistake the text data for ring tone data. It would then handle the subsequent processes accordingly, resulting in the malfunctioning of the cellular phone.

There is also the need to protect ring tone data recorded in a two-dimensional code by making it difficult for conventional code readers to read the data and thus allowing only specific users or devices to do so.

SUMMARY OF THE INVENTION

It is therefore an object of the invention to provide a technique for separating ring tone data, for example, from other data in recorded data. It is another object to protect two-dimensionally encoded data.

In one aspect, the invention provides an encoded data structure comprising a body portion containing information content and a header portion having a function of indexing the body portion. The header portion includes a data identifier for identifying the type of data in the body portion. By using this data structure, the type of encoded data in the body portion can be determined based on the header portion.

The header portion preferably comprises an encryption identifier indicating whether or not the data in the body portion is encrypted. The identification using the encryption identifier allows the subsequent processes to be carried out properly.

In another aspect, the invention provides a code-reading terminal. The code-reading terminal includes an imaging unit for photographing encoded data comprising a header portion and a body portion, the header portion including a data identifier indicating the type of data in the body portion. It also includes a data identifying unit for identifying the type of encoded data photographed by the imaging unit on the basis of the data identifier. The terminal further includes a control unit for reading the encoded data depending on the data type identified by the data identifying unit, and for reproducing the data that has been read.

The code-reading terminal, which comprises the data identifying unit for identifying the type of encoded data photographed by the imaging unit based on the data identifier, can determine the type of encoded data.

Preferably, whether the encoded data is encrypted or not is determined. If encrypted, the data is reproduced after decrypting it.

Preferably, the data type is identified by the data identifying unit when the encoded data is read. Then, appropriate processes are automatically carried out, whereby encrypted data is then decrypted and reproduced while displaying other data. This way, the user can process content data without having to pay attention to the presence or absence of encryption.

BRIEF DESCRIPTION OF THE DRAWINGS

FIG. 1(A) shows a front face of the terminal. FIG. 1(B) shows a back face of the terminal.

FIG. 5(A) shows an example of the screen for the selection of a normal camera mode or a bar-code (reading) mode. FIG. 5(B) shows an example of the screen for the selection of a one-dimensional or two-dimensional bar code.

FIG. 6(A) shows how the two-dimensional bar code expands beyond the display region. FIG. 6(B) shows the two-dimensional bar code located within the display region.

FIG. 7(A) shows how the two-dimensional bar code on the display screen is shaded. FIG. 7(B) shows how the influence of the shade is reduced by turning on a light.

DESCRIPTION OF PREFERRED EMBODIMENTS

This application is based on the Japanese patent application 2002-206736, filed on Jul. 16, 2002, all the contents of which is incorporated in this application by reference.

Figure 1:
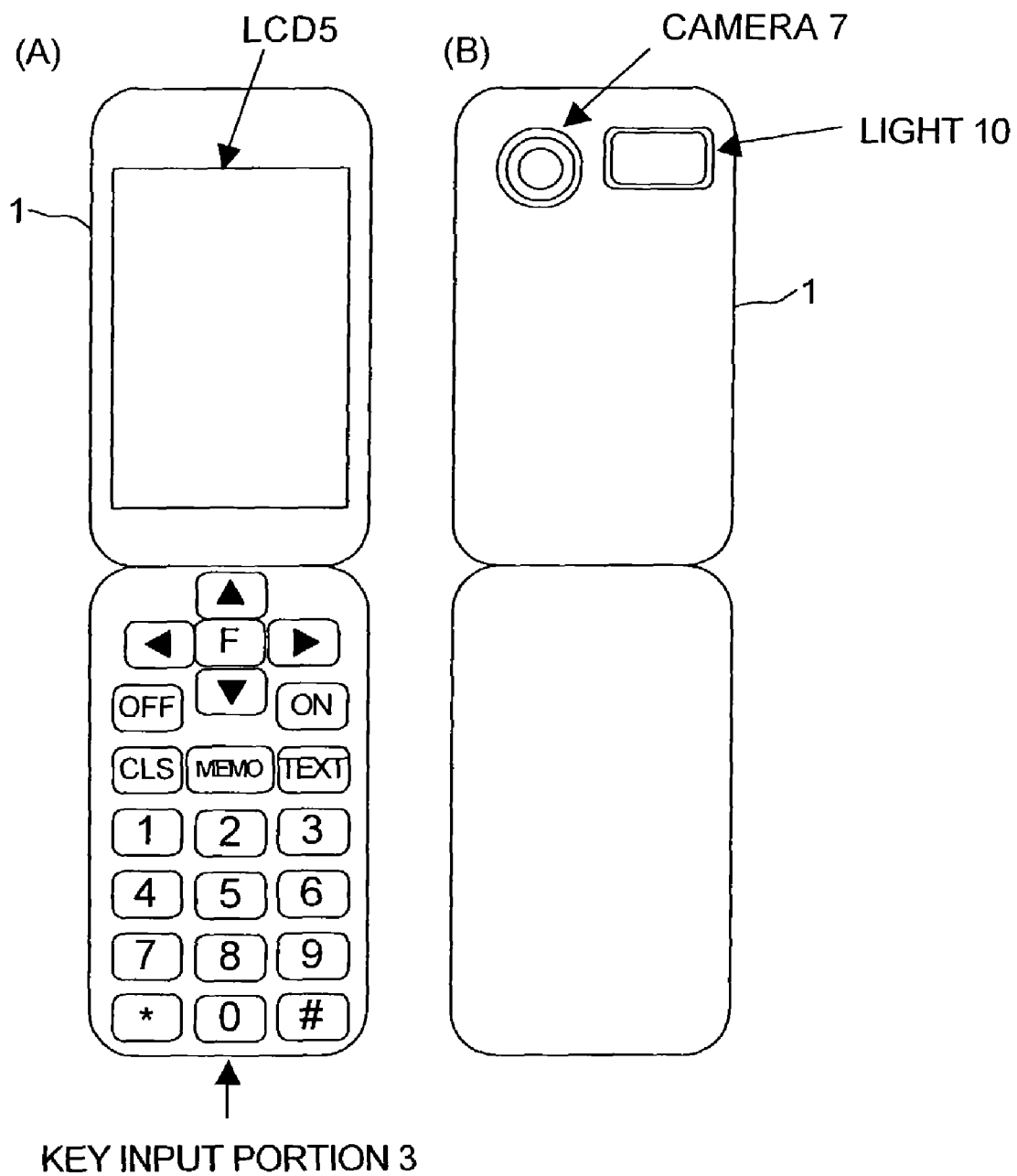
FIG. 1 shows an example of a two-dimensional code-reading terminal according to an embodiment of the invention.
Figure 2:
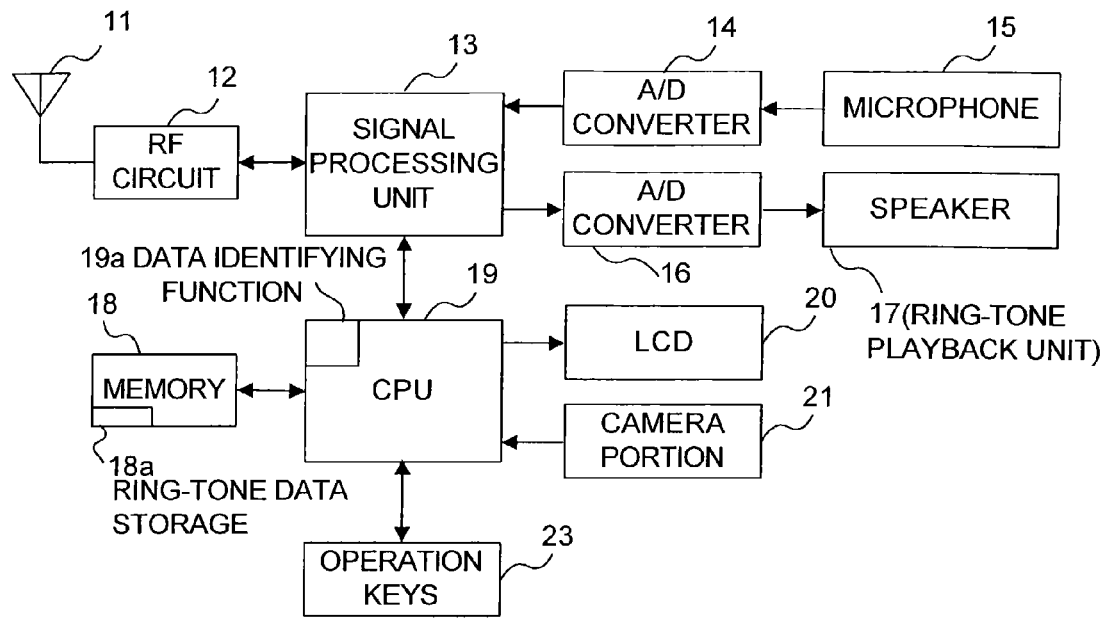
FIG. 2 shows a functional block diagram of the two-dimensional code-reading terminal according to the embodiment.
Figure 3:
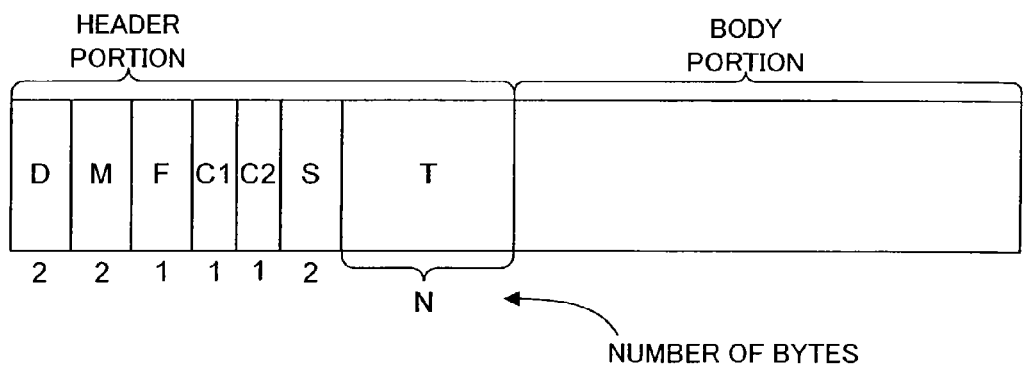
FIG. 3 shows an example of the data structure of the two-dimensional code according to the embodiment.
Figure 4:
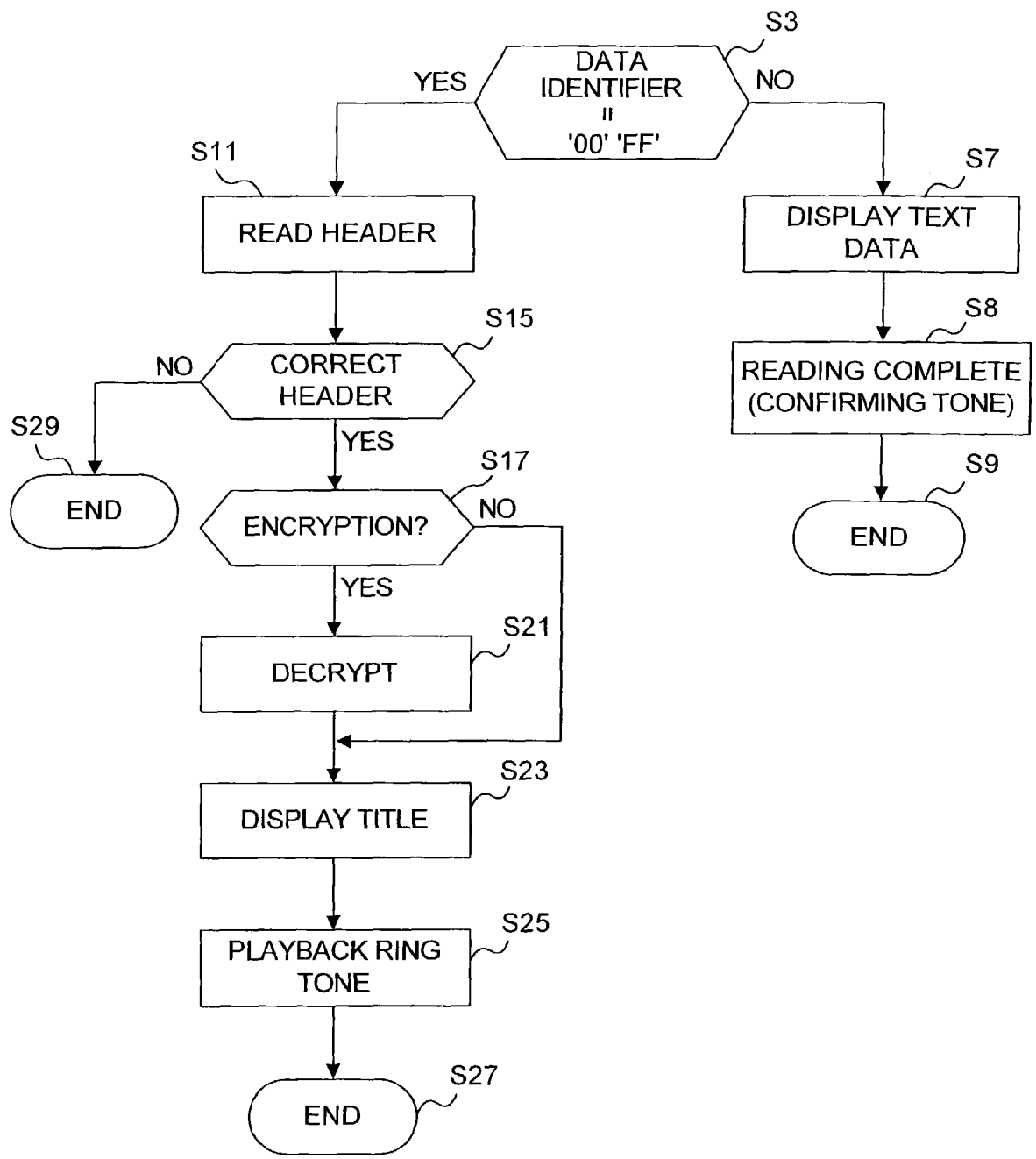
FIG. 4 shows a flowchart of the processes starting with the reading of a code up to the reproduction of a ring tone on the two-dimensional code-reading terminal according to the embodiment.
Figure 5:
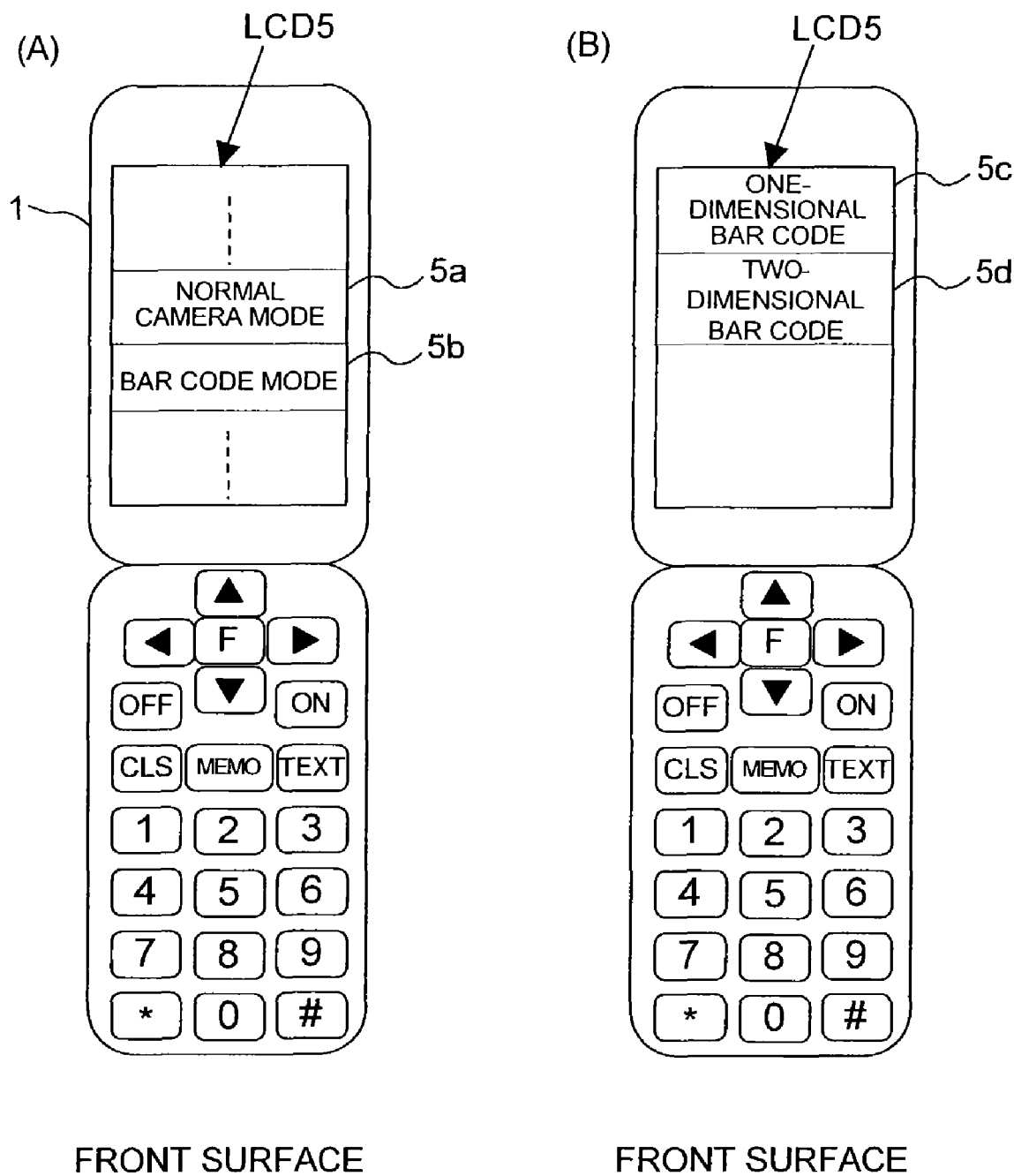
FIG. 5 shows display screens during various processes carried out on the two-dimensional code-reading terminal according to the embodiment.

The code-reading technique according to an embodiment of the invention will be hereafter described by referring to the drawings. FIG. 1 shows a cellular phone (portable terminal) equipped with an imaging function (camera) that forms a part of the code-reading function. FIG. 1(A) shows a liquid crystal display (LCD) side (front surface) of the cellular phone. FIG. 1(B) shows a camera side (back surface) of the phone. FIG. 2 shows a functional block diagram of the cellular phone of FIG. 1. FIG. 3 shows an example of the data structure used in the code-reading technique according to the embodiment. FIG. 4 shows a flowchart of the processes including the processing of data read by the code-reading technique according to the embodiment, and the reproduction of a melody. FIGS.

Figure 6:
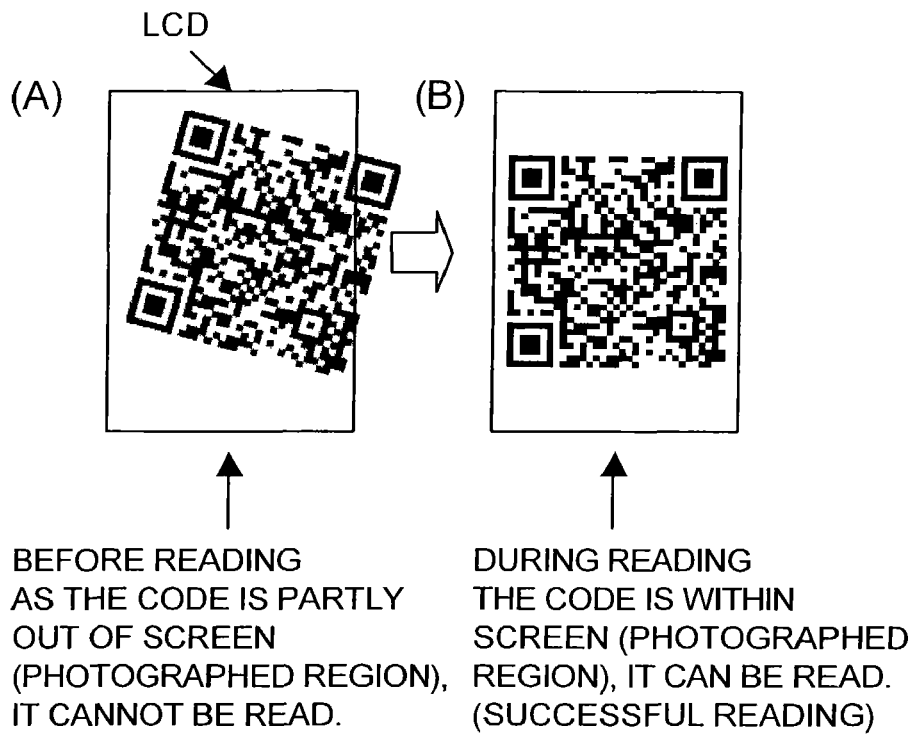
FIG. 6 shows display screens during various processes carried out on the two-dimensional code-reading terminal according to the embodiment.
Figure 7:
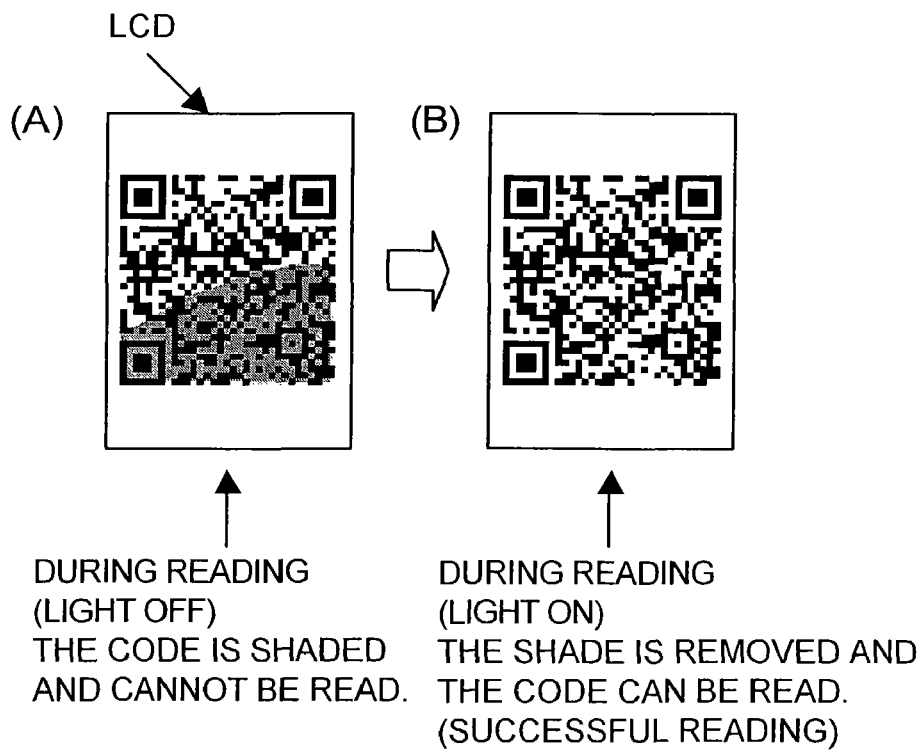
FIG. 7 shows display screens during various processes carried out on the two-dimensional code-reading terminal according to the embodiment.
Figure 8:
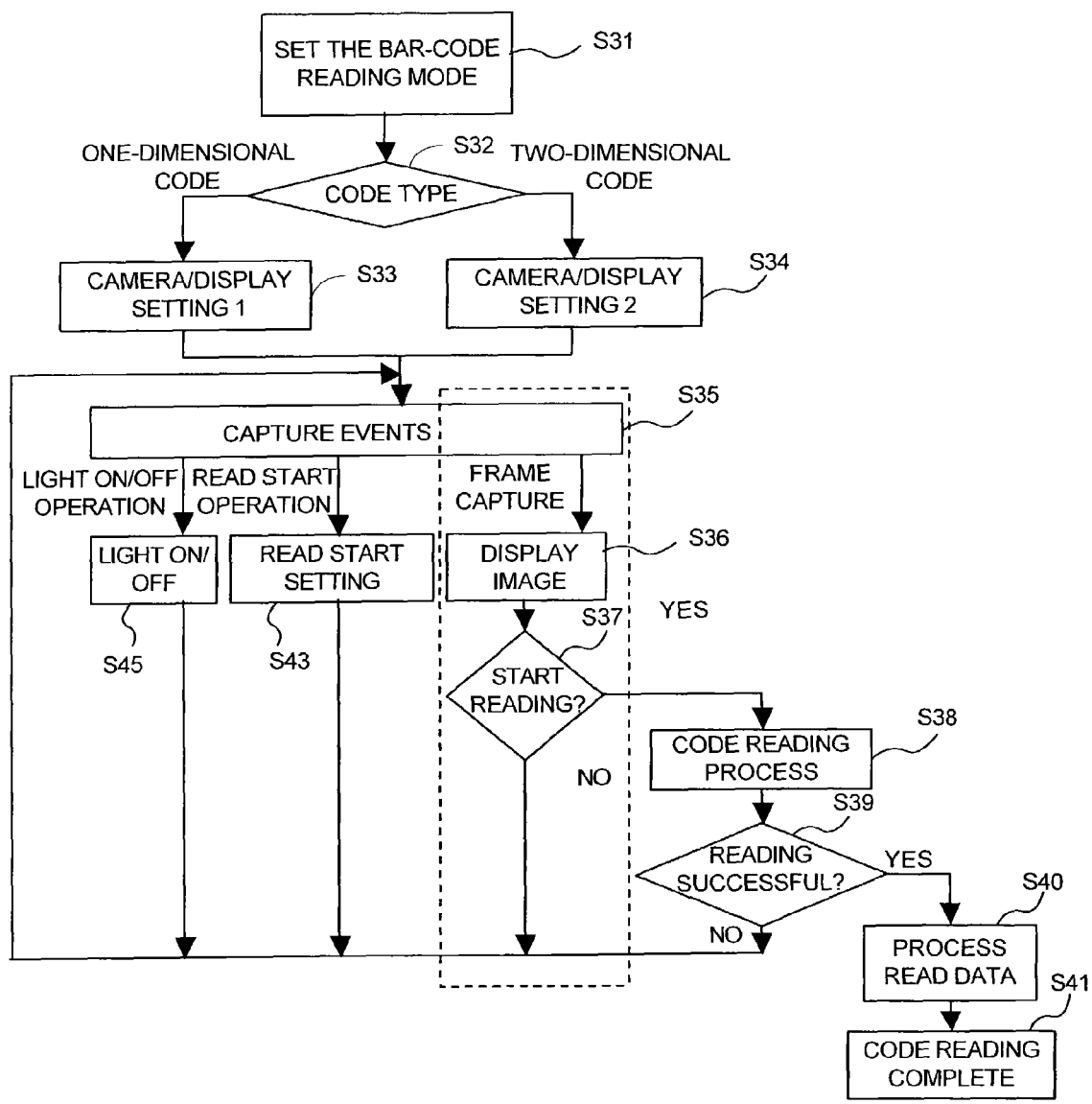
FIG. 8 shows a flowchart of the process of reading a code in the two-dimensional code-reading terminal according to the embodiment.

5(A) and (B), FIGS. 6(A) and (B), and FIGS. 7(A) and (B) show examples of the cellular phone screen during the code-reading operation using the code-reading technique of the embodiment. FIG. 8 shows a specific example of the processes involved in the code-reading operation.

As shown in FIG. 1(A), a key input portion 3 with a variety of input keys and an LCD portion 5 are mounted on the front surface of a cellular phone 1. On the back surface of the cellular phone 1, a camera (imaging unit) 7, such as a CCD camera, and a light 10 (such as an LED or other illuminating device) are mounted, as shown in FIG. 1(B).

Referring to FIG. 2, the cellular phone 1 includes an antenna 11, an RF (radio frequency) circuit 12, a signal processing unit 13, a CPU 19 for controlling them, and a memory 18. It also includes a microphone 15, an A/D converter 14 for converting voice data entered via the microphone into digital data, a D/A converter 16 for converting a digital signal from the signal processing unit 13 into an analog signal, and a speaker 17 (including a ring tone reproduction unit) for outputting a signal from the D/A converter 16. The LCD 5 (display unit), the camera unit 7 (imaging unit), and the key input unit 3 together form a user interface.

The CPU 19 has a data identifying function 19a for identifying the type of data that is obtained by reading a code. The memory 18 includes a ring tone data storage region 18a for storing ring tone data.

Now referring to FIG. 3, the data structure in the present embodiment is divided into a header portion and a body portion. The header portion has, starting from the head, a data identifier region D (2 bytes long), a maker identifying code region M (2 bytes long), a format number region F (1 byte long), an encryption identifier region C1 (1 byte long), an encryption version region C2 (1 byte long), a region S (2 bytes long) indicating the length (N) of the title, and a region T (N bytes long) indicating information about the title of a ring tone, for example. In the body region, content data regarding the implementation of ring tones, for example, is stored. The data identifier D is determined by a prior arrangement such that it takes a specific value (such as 0x00 or 0xFF) that does not exist in normal text documents. Thus, in a reading process, the information content of the body portion can be determined to be that of ring tone data, for example, if its data identifier indicates a predetermined value.

Referring to FIGS. 4 to 8, the sequence of processes from a two-dimensional code-reading process to a ring tone reproduction process will be described.

In FIG. 5(A), the LCD 5 displays a screen prompting the selection of a normal camera mode 5a or a bar-code mode 5b (the setting of the bar-code reading mode in step S31 in FIG. 8). As the user selects the bar-code mode 5b, the screen is changed so as to prompt the selection of a one-dimensional bar code 5c or a two-dimensional bar code 5d, as shown in FIG. 5(B). If the two-dimensional bar code mode including ring tone data is selected (the step of selecting the code type in step S32 in FIG. 8), the cellular phone is now ready to read the two-dimensional bar code including ring tone data. In the case of the one-dimensional code, the camera and display settings are given a predetermined value (set value 1). In the case of two-dimensional code, another predetermined value (set value 2) is employed. For example, in the case of one-dimensional code, the photographed range is 640 in length× 480 in width, and the display is set so that it displays this camera image in equal size. In the case of two-dimensional code, the photographed range is 320 in length×240 in width, and the display is set so that it displays twice the size of this camera image both in length and width. In addition, camera settings common to the one- and two-dimensional codes include the emphasis of edge components and contrast.

The camera is now ready for event capture, and it switches processes depending on individual events. A light ON/OFF operation event concerns the switching on or off of the light in response to the user pushing a light ON or OFF button (step S45).

A read start operation event takes place when the user pushes a read start button in order to start the reading of the bar code, whereupon a flag indicating the start of reading is set. A mark indicating the position of the camera can be displayed on the LCD, and the mark may be eliminated once a reading has started. A frame capture event takes place after the camera has read one frame of an image. Initially, the image that has been read according to the settings is displayed on the LCD (step S36). The position of the camera may be simultaneously displayed on the LCD. In step S39, it is determined whether the reading has been successful. If the read start flag is set, a code-reading process is initiated (step S38). If it is determined that the reading has been unsuccessful in step S39, the routine returns to the event read step S35. If it is determined that the code reading has been successful in step S39, a read data process is carried out (step S40), and the reading result is appropriately presented to the user according to the type of the read data. Then, the code-reading process comes to an end (step S41).

For example, before the start of reading, the display can be made smoothly at a high frame rate because the code-reading process has not been initiated. Prior to reading, the user can easily operate the unit to bring the code on the screen while looking at the screen. When the code is located on the screen, the user starts the reading start operation, and then the result of reading is displayed. In operation, the read start operation is not initiated as long as the two-dimensional code is not completely on the screen (imageable region), as shown in FIG. 6(A), as the code is partly out of screen (photographed region), which prevents the reading of the code. Once it is confirmed that the two-dimensional code is on the screen (imageable region), as shown in FIG. 6(B), the code is within screen (photographed region), the read start operation is initiated, followed by the reading of the code.

Reading might be hampered if the two-dimensional code is shaded during the reading operation, as shown in FIG. 7(A). In such a case, the light 10 (FIG. 1(B)) can be turned on, as shown in FIG. 7(B), so that the influence of the shade can be diminished and the probability of successful reading can be increased.

Referring to FIG. 4, the procedure of read data processes will be described. First, in step S3, the data identifier is analyzed by the data identifying function 19a of the CPU 19. If the data identifier is "00" or "ff" for example, the data is determined not to be text data, and then the header following the data identifier is read (step S11). It is then determined in step S15 whether or not the header is correct. If the header is determined to be incorrect in step S15, the process is terminated (step S29). If it is determined to be correct in step S15, whether or not the body portion is encrypted is determined in step S17 on the basis of the encryption identifier C1. If the body portion is determined to be encrypted, a decryption process is carried out in step S21 by referring to the information C2 concerning encryption version. If the body portion is determined not to be encrypted in step S17, the process goes on to step S23 without decryption. In step S23, the title is displayed, and the ring tone is reproduced in step S25. The process comes to an end in step S27. If the data identifier does not have a prescribed value such as "00" or "ff" in step S3, the data is determined to be text data. The text data is then displayed in step S7, and a confirmation note is reproduced in step S8, thereby indicating to the user the completion of reading. The process comes to an end in step S9.

By these processes, the ring tone data, for example, and other data in the recorded two-dimensional code can be successfully separated. Further, the two-dimensionally encoded data can be protected by encryption.

By deciding in advance that encrypted data is content data, whether given data is content data or not can be determined based on the presence of encryption.

While the invention has been described with reference to a preferred embodiment thereof, it will be understood by those skilled in the art that many variations, modifications or improvements thereof are possible.

For example, while in the above described embodiment the ring tone code employed a two-dimensional bar code, content other than ring tone may be two-dimensionally encoded. It is also possible to use codes other than two-dimensional bar codes.

Thus, in accordance with the code-reading technique of the invention, ring tone data and other data in recorded data can be appropriately separated.

What is claimed is:

1. A cellular phone comprising
    a code-reading terminal including an imaging device for optically imaging encoded data including a header portion and a body portion, said header portion including a data identifier indicating the type of data in the body portion;
    a data identifying unit that recognizes said data identifier and estimates the type of said encoded data optically imaged by said imaging device based on said recognized data identifier; and
    a control unit that reads the contents of said encoded data in a manner suited for the type of data estimated by said data identifying unit and reproduces the thus read data.

2. The cellular phone according to claim 1, further comprising a plurality of audio/video reproducing units, wherein said control unit selects one of the audio/video reproducing units suited for the type of data and reproduces the thus read data using the selected audio/video reproducing unit.

3. The cellular phone according to claim 1, wherein said encoded data including said header portion and said body portion is pictorially encoded data, and said data identifying unit performs recognition of said pictorially encoded data to obtain a symbol as said recognized data identifier.

4. A ring tone data code-reading terminal comprising:
    an imaging device for optically imaging encoded data comprising a header portion and a body portion, said body portion including encoded ring tone data, and said header portion including a data identifier indicating the type of data in said body portion;
    a data identifier unit for recognizing the data identifier and identifying the data type of the encoded data optically imaged by the imaging unit based on the recognized data identifier; and
    a control unit for reading the contents of said encoded data in a manner suited for the type of data identified by said data identifier unit and for reproducing the thus read ring tone data.

5. A cellular phone comprising the code-reading terminal according to claim 4.

6. The ring tone data code-reading terminal according to claim 4, further comprising a plurality of audio/video reproducing units, wherein said data identifier unit recognizes said encoded data identifier to obtain a symbol, and wherein said control unit selects an audio reproducing unit from among the audio/video reproducing units based on said symbol for reproducing the thus read ring tone data.

7. The ring tone data code-reading terminal according to claim 6, wherein said encoded data comprising said header portion and said body portion is pictorially encoded data, and said data identifier unit performs recognition of said pictorially encoded data to obtain the symbol corresponding to the encoded data identifier.

8. A recording medium in which a program is recorded for causing a computer to carry out the steps of:
    optically imaging encoded data comprising a header portion and a body portion, said header portion including a data identifier indicating the type of data in said body portion;
    recognizing said data identifier and identifying the type of said encoded data that has been optically imaged based on said recognized data identifier; and
    reading the contents of said encoded data in a manner suited for the type of data identified and reproducing the thus read data.

9. The recording medium according to claim 8, wherein said encoded data comprising said header portion and said body portion is pictorially encoded data, and said recognizing comprises recognizing of said pictorially encoded data to obtain a symbol as said recognized data identifier.

10. A code-reading terminal comprising:
    an imaging device for optically imaging encoded data including a header portion and a body portion, said header portion including a data identifier indicating the type of data in said body portion;
    a data identifying unit that recognizes said data identifier from an image of the data identifier output by the imaging device, and estimates the type of said encoded data optically imaged by the imaging device based on said recognized data identifier; and
    a control unit that reads the contents of said encoded data in a manner suited for the type of data estimated by said data identifying unit and reproduces the thus read data.

11. The code-reading terminal according to claim 10, wherein whether or not the encoded data is encrypted is determined and, if encrypted, the data is reproduced after decryption.

12. The code-reading terminal according to claim 11, wherein the data type is determined by the data identifying unit when the encoded data is read, and wherein encrypted data is decrypted and then reproduced, while unencrypted data is displayed.

13. The code-reading terminal according to claim 10, wherein said data identifying unit determines whether the type of the encoded data is either ring tone data or data other than ring tone data based on the recognized data identifier, and if the encoded data is determined to be ring tone data, the data in the body portion is reproduced by said control unit.

14. The code-reading terminal according to claim 10, wherein said data identifying unit determines whether the type of the encoded data is either ring tone data or data other than ring tone data based on the recognized data identifier, and if the encoded data is determined to be data other than ring tone data, the data other than ring tone data is displayed on the display unit by said control unit.

15. The code-reading terminal according to claim 10, wherein said encoded data including said header portion and said body portion is pictorially encoded data, and said data identifying unit performs recognition of said pictorially encoded data to obtain a symbol as said recognized data identifier.

* * * * *